Figure 1:
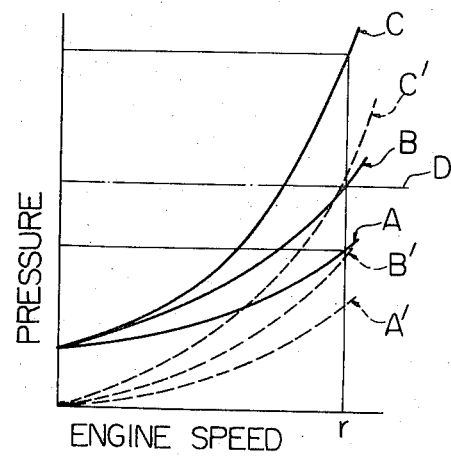

United States Patent [19]

Hayashi

[11] 3,791,146

[45] Feb. 12, 1974

[54] SECONDARY AIR REGULATING SYSTEM FOR AUTOMOTIVE INTERNAL COMBUSTION ENGINE

[75] Inventor: Yoshimasa Hayashi, Yokohama, Japan

[73] Assignee: Nissan Motor Company, Limited, Yokohama, Japan

[22] Filed: Apr. 27, 1972

[21] Appl. No.: 247,985

[30] Foreign Application Priority Data
Nov. 1, 1971 Japan.............................. 46/100897

[52] U.S. Cl. ................................................ 60/289
[51] Int. Cl. ............................................ F02b 75/10
[58] Field of Search ............................. 60/289, 290

[56] References Cited
UNITED STATES PATENTS

| | | | |
|---|---|---|---|
| 3,059,419 | 10/1962 | Schnabel............................. | 60/290 |
| 3,360,927 | 1/1968 | Cornelius............................ | 60/303 |
| 3,392,523 | 7/1968 | Hyde.................................... | 60/290 |
| 3,568,435 | 3/1971 | May..................................... | 60/280 |
| 3,641,767 | 2/1972 | Kraus................................... | 60/274 |

Primary Examiner—Douglas Hart

[57] ABSTRACT

A secondary air regulating system for regulating the amount of secondary air to be supplied to an exhaust port of an internal combustion engine for facilitating oxidizing reaction of engine exhaust gases to eliminate the noxious and harmful components therein. The secondary air regulating system has an air gallery leading from a pneumatic pump through a main passageway and communicating with the exhaust manifold of the engine through a secondary air inlet pipe opening into the exhaust manifold, and a control valve assembly which is located in the main passageway to selectively discharge an excess secondary air to the atmosphere to adjust the amount of secondary air to be supplied to the exhaust manifold of the engine to a value optimum for effecting satisfactory oxidizing reaction of the engine exhaust gases, the control valve assembly being adapted to be responsive to at least one of the pressure prevailing in the air gallery and the pressure of exhaust gases in the exhaust manifold thereby to control the amount of leakage of secondary air to the atmosphere in response thereto.

5 Claims, 2 Drawing Figures

SECONDARY AIR REGULATING SYSTEM FOR AUTOMOTIVE INTERNAL COMBUSTION ENGINE

The present invention relates in general to improvements in the exhaust system of an automotive internal combustion engine and, more particularly, to a system for supplying secondary air to an exhaust manifold of the engine to convert engine exhaust gases containing noxious and harmful components into harmless ones before the exhaust gases are released out of the exhaust system.

In the operation of an automotive internal combustion engine, a large quantity of unburned or partially burned exhaust gases are discharged into the atmosphere from an exhaust system of the engine. As is well known, such unburned or partially burned exhaust gases contain noxious and harmful components such as hydrocarbons and carbon monoxide, causing serious air pollution especially in urban areas. Conversion of the unburned or partially burned toxic compounds of the engine exhaust gases into harmless compounds is requisite for preventing the air pollution in urban areas today and, for this purpose, it is an ordinally practice to have the combustible component of the engine exhaust gases burned in the exhaust system of the engine before it escapes into the atmosphere.

In order that the unburned content of the engine exhaust gases be burned or oxidized while it stays in the exhaust system, as is well known, it is necessary to supply additional air to the exhaust system for satisfactory combustion of the unburned content. This additional air will be hereinafter referred to as a secondary air. A pneumatic pump has heretofore been employed to supply the secondary air to the exhaust manifold of the engine for the purpose set forth further hereinabove. The pneumatic pump is usually combined with a relief valve of the type having a spring, which relief valve is disposed in a passageway between the pneumatic pump and the exhaust manifold of the engine. This prior art relief valve is so constructed as to cause an excessive secondary air to escape to the atmosphere when the pressure of the secondary air prevailing in the conduit reaches a predetermined level. It is thus impossible to adjust the secondary air to an amount appropriate for efficient oxidation of the engine exhaust gases throughout the varying engine operations.

It is, therefore, an object of the present invention to provide a novel and improved system for supplying secondary air to an exhaust manifold of an automotive internal combustion engine for effecting satisfactory combustion or oxidation of unburned engine exhaust gases.

Another object of the present invention is to provide a novel and improved system for regulating the amount of secondary air to a value appropriate for efficient oxidation of unburned exhaust gases emitted from an automotive internal combustion engine.

A still another object of the present invention is to provide a novel and improved system for regulating the amount of secondary air to be mixed with unburned exhaust gases emitted from an automotive internal combustion engine in accordance with varying engine operations.

A further object of the present invention is to provide a novel and improved system for increasing the amount of secondary air to be mixed with exhaust gases expelled from an automotive internal combustion engine in proportion to engine speeds.

A still further object of the present invention is to provide a novel and improved system for adjusting the amount of secondary air to be supplied to an exhaust manifold of an automotive internal combustion engine in accordance with the variations in pressure of exhaust gases discharged into the exhaust manifold to initiate efficient oxidation of the exhaust gases for thereby satisfactorily eliminating air pollution.

A still further object of the present invention is to provide a novel and improved secondary air regulating system for use with an exhaust system of an automotive internal combustion engine, which system is simple in construction, easy to install in existing motor vehicles and economical to manufacture.

In general, these objects of the present invention are achieved by a secondary air regulating system for an automotive internal combustion engine having an exhaust port located immediately downstream of an exhaust valve and an exhaust manifold communicating with the exhaust port. The secondary air regulating system consists of a pneumatic pump driven by the internal combustion engine for supplying secondary air to the exhaust manifold downstream of the exhaust port. The pneumatic pump is in communication with a main passageway in which a check valve is disposed to prevent back-flow of exhaust gases from the exhaust manifold to the pneumatic pump. The main passageway communicates with an air gallery which in turn communicates with a secondary air inlet pipe opening into the exhaust manifold downstream of the exhaust port to supply the secondary air thereinto for thereby oxidizing the exhaust gases from the internal combustion engine. The secondary air regulating system also consists of a control valve assembly which is located in the main passageway upstream of the check valve for selectively discharging an excess secondary air to adjust the amount of secondary air to be introduced into the exhaust manifold. The control valve assembly is responsive to at least one of the variations in pressure prevailing in the air gallery and the pressure of exhaust gases in the exhaust manifold to control the amount of leakage of secondary air to the atmosphere. In a preferred embodiment, the control valve assembly includes a valve casing having first and second chambers. The first chamber has an inlet port communicating with the main passageway and an outlet port opening to the atmosphere. To open and close the inlet port, a valve plate is slidably disposed in the first chamber and is biased by a first biasing means. A second biasing means is also disposed in the second chamber for biasing the valve plate. This second chamber communicates with at least one of the air gallery and exhaust manifold and causes the biasing force of the second biasing means to vary in accordance with the variations in the pressure prevailing in the air gallery or exhaust manifold. The pressure in the air gallery is determined by the pressure of secondary air in the main passageway and the pressure of exhaust gases in the exhaust manifold sensed by the secondary air inlet pipe.

Figure 2:
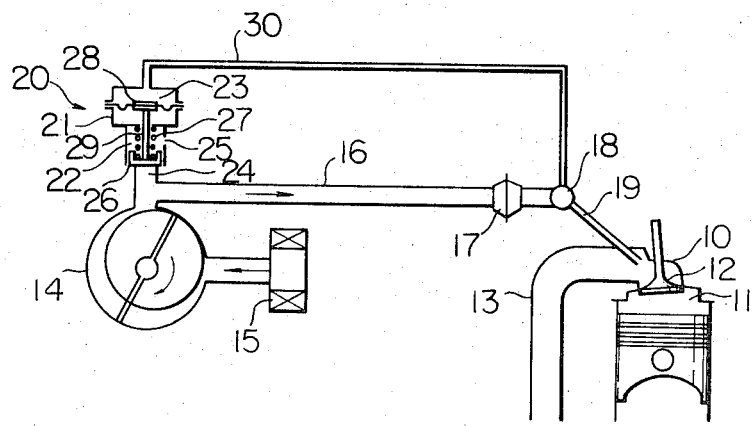

These and other objects and advantages of the present invention will become more apparent from the following description when taken in conjunction with the accompanying drawing, in which:

FIG. 1 is a graph diagrammatically illustrating a typical example of the relationship between the amount of secondary air flowing into an exhaust system and engine speed; and FIG. 2 is a schematic view of a secondary air regulating system according to the present invention, the regulating system being shown as incorporated in an exhaust system of an automotive internal combustion engine.

As illustrated in FIG. 1, the amount of secondary air required for efficient oxidation of engine exhaust gases varies with engine speed and pressure variation of the engine exhaust gases in an exhaust manifold of an automotive internal combustion engine, which pressure of the exhaust gases increases as an intake manifold vacuum of the engine decreases. For example, reference to curves A, B and C of FIG. 1 illustrate diagrammatically the amount of secondary air required for efficient oxidation in response to engine speed when the intake manifold vacuum is at the levels of −450 mmHg, −300 mmHg and −150 mmHg, respectively. The curve D, which is shown by a phantom line in FIG. 1, indicates that the amount of secondary air to be admixed to the engine exhaust gases is held constant throughout the varying engine speeds and varying intake manifold vacuums. This implies that if the automobile is coasting downhill while the engine is running at high speed with an engine carburetor throttle valve being substantially closed, an excess secondary air is supplied to the exhaust manifold of the engine. This excessive secondary air adversely effects the oxidation of the engine exhaust gases in the exhaust manifold of the engine so that it is quite difficult to reduce the unburned or partially burned exhaust gases. On the contrary, if the engine is running at high speed with the engine carburetor throttle valve being fully opened, the amount of secondary air to be supplied to the exhaust manifold is insufficient for efficient oxidation of the unburned components in the engine exhaust gases. It is thus concluded that in order to initiate efficient oxidation of noxious and harmful components in the engine exhaust gases, it is desirable to adjust the amount of secondary air in accordance with the engine speed and the pressure variations in the exhaust manifold.

Such concept is realized in a simplified form in the secondary air regulating system according to the present invention. Referring to FIG. 2, there is schematically shown the secondary air regulating system implementing the present invention. The secondary air regulating system proposed by the present invention is specifically suited for use in a usual automotive internal combustion engine of the type which comprises an exhaust port 10 leading from a combustion chamber 11 of the engine, an exhaust valve 12 adapted to control the discharge of the exhaust gases out of the exhaust port 10, and an exhaust manifold 13 connected with the exhaust port 10. For the purpose of accelerating the oxidation of the mixture of the exhaust gases and secondary air in the exhaust manifold, a chemical catalytic converter may be provided at a suitable position of the exhaust manifold 13, though not shown.

As previously mentioned, the unburned or partially burned exhaust gases emitted from the combustion chamber 11 into the exhaust port 10 contain noxious and harmful compounds which cause serious air pollution especially in urban areas. To effect oxidation of these unburned exhaust gases thereby to convert the noxious compounds into harmless ones, secondary air is introduced into the exhaust manifold 13 downstream of the exhaust valve 12 to accomplish this end, the secondary air regulating system according to the present invention includes a pneumatic pump 14 which is driven by the engine and which leads from an air cleaner 15 opening to the atmosphere. The pressure of secondary air discharged out of the pneumatic pump 14 increases as the engine speed increases. The pneumatic pump 14 is well known in the art of fluid transport and, therefore, the detail discussion of the same is herein omitted for the sake of simplicity of illustration. This pneumatic pump 14 sucks in atmospheric air or secondary air from the air cleaner 15 and discharges it to a main passageway 16 as shown by an arrow in FIG. 2. The secondary air discharged into the main passageway 16 is passed through a check valve 17 to an air gallery 18, from which it is introduced into the exhaust manifold 13 through a secondary air inlet pipe 19 which opens into the exhaust manifold 13 just downstream of the exhaust valve 12. The check valve 17 may be of any known construction insofar as it functions to prevent the back-flow of the exhaust gases into the pneumatic pump 14.

According to the present invention, there is further provided in the secondary air regulating system a control valve assembly 20 which is, as will be discussed in more detail, so constructed as to respond to the pressure prevailing in the air gallery 18 which varies in accordance with the pressure of the secondary air discharged from the pneumatic pump 14 and the pressure of the exhaust gases emitted from the combustion chamber 11 for thereby adjusting the amount of secondary air required for the efficient oxidation of the exhaust gases throughout the varying engine operations. It should be noted that the pressure of the exhaust gases varies in inversely proportion to the value of the intake manifold vacuum. Thus, the pressure of the exhaust gases increases as the intake manifold vacuum decreases while it decreases as the intake manifold vacuum increases. This is due to the fact that the suction air to be supplied to the engine combustion chamber 11 varies in accordance with the opening condition of the engine carburetor throttle valve. In order to initiate efficient oxidation of the exhaust gases, the amount of secondary air should be increased when the intake manifold vacuum is at low level and should be decreased when the intake manifold vacuum is at high level.

As shown in FIG. 2, the control valve assembly 20 consists of a valve casing 21 having first and second chambers 22 and 23. The first chamber 22 has an inlet 24 which communicates with the main passageway 16 downstream of the pneumatic pump 14 and has an outlet port 25 which opens to the atmosphere. A valve plate 26 is slidably disposed in the first chamber 22 to open and close the inlet port 24 thereby to control the amount of leakage of the secondary air therethrough to the outlet port 25. The valve plate 26 is biased by first biasing means such as a compression spring 27 in a direction to close the inlet port 24 the compression spring 27 being shown as located in the first chamber 22. A second biasing means 28 is disposed in the second chamber 23 and operatively connected to a rod 29 which in turn is connected to the valve plate 26 so that the valve plate 26 is further biased in the direction to close the inlet port 24 in response to the pressure prevailing in the air gallery 18 or to the pressure prevailing in the exhaust manifold. The second chamber 23 is shown as communicating through a branch passageway 30 with the air gallery 18 but may communicates with the exhaust manifold downstream of the exhaust port 10. In the illustrated embodiment, the second biasing means is shown as diaphragm member but may be constituted by a piston, if desired. It should be understood that the spring force of the compression spring 27 is determined to be lower level than that of the prior art relief valve because the valve plate 26 is biased by, in addition to the compression spring 27, the second biasing means 28. It should be appreciated that the pressures at which the valve plate 26 is moved toward a position to open the inlet port 24 vary in accordance with the curves A, B and C as shown by solid lines in FIG. 2. In FIG. 1, the curves A', B' and C' indicate the variations of pressures prevailing in the air gallery 18 when the intake manifold vacuum is at the levels of −450 mmHg, −300 mmHg and −150 mmHg, respectively.

With the arrangement described hereinabove, when the intake manifold vacuum is at higher level, for example at the level of −450 mmHg, the pressure of the exhaust gases in the exhaust manifold 13 is at low level so that the pressure prevailing in the air gallery 18 is low. Consequently, the pressure exerted on the diaphragm member 28 becomes low and, therefore, the valve plate 26 is moved toward a position to open the inlet port 24 at an early stage by the pressure of secondary air acting thereon against the forces of first and second biasing means 27 and 28. Thus, the pressure of secondary air in the main passageway 16 is held in a lower level and, accordingly, the amount of secondary air to be introduced into the exhaust manifold 13 is maintained in a lower value which is required for the efficient oxidation of the exhaust gases.

When, however, the intake manifold vacuum is at lower level, for example at the level of −150 mmHg, the pressure of the exhaust gases in the exhaust manifold 13 is high and accordingly the pressure prevailing in the air gallery 18 becomes high with a resultant increase in the biasing force of the second biasing means 28. Consequently, the biasing forces exerted on the valve plate 26 becomes high so that the pressure of secondary air in the main passageway 16 is increased to increase the amount of secondary air to be admitted into the exhaust manifold 13 to a higher value required for the efficient oxidation of the exhaust gases.

It will now be appreciated from the following description that the secondary air regulating system according to the present invention effectively utilize the pressure of the exhaust gases in the exhaust manifold and the pressure of the secondary air for continuosly determining the amount of secondary air to be introduced into the exhaust manifold to achieve a proper value required for the varying operating conditions of the engine. In this manner the unburned or partially burned exhaust gases can be burned or oxidized satisfactorily throughout the whole engine operating conditions.

What is claimed is:

1. In an automotive internal combustion engine having an exhaust port located downstream of an exhaust valve and an exhaust manifold communicating with said exhaust port, a system for regulating the amount of secondary air to be fed to said exhaust manifold downstream of said exhaust port for oxidizing unburned exhaust gases from said engine comprising, in combination, a pneumatic pump driven by said engine for supplying secondary air to said exhaust manifold, a main passageway communicating with said pneumatic pump, a check valve disposed in said main passageway to prevent the back-flow of the exhaust gases to said pneumatic pump, an air gallery communicating with said main passageway downstream of said check valve, a secondary air inlet pipe communicating with said air gallery and opening into said exhaust manifold and being exposed to the pressure of the exhaust gases in said exhaust manifold, and a control valve assembly located in said main passageway downstream of said pneumatic pump, said control valve assembly including means defining an inlet communicating with said main passageway up-stream of said check valve and means defining an outlet, a valve plate disposed adjacent said inlet for opening and closing said inlet, and biasing means operatively connected to said valve plate, said biasing means being responsive to at least one of the pressures prevailing in said air gallery and the pressures prevailing in said exhaust manifold to bias said valve plate toward a direction to close said inlet, whereby said valve plate is movable to open and close said inlet thereby to vary the level of secondary air pressure in said main passageway in dependence on the pressure difference between said secondary air pressure and said at least one of the pressures prevailing in said air gallery and the pressures prevailing in said exhaust manifold.

2. In an automotive internal combustion engine having an exhaust port located downstream of an exhaust valve and an exhaust manifold communicating with said exhaust port, a system for regulating the amount of secondary air to be fed to said exhaust manifold downstream of said exhaust port for oxidizing unburned exhaust gases from said engine comprising, in combination, a pneumatic pump driven by said engine for supplying secondary air to said exhaust manifold, a main passageway communicating with said pneumatic pump, a check valve disposed in said main passageway to prevent the back-flow of the exhaust gases to said pneumatic pump, an air gallery communicating with said main passageway downstream of said check valve, a secondary air inlet pipe communicating with said air gallery and opening into said exhaust manifold, and being exposed to the pressure of the exhaust gases in said exhaust manifold, and a control valve assembly located in said main passageway downstream of said pneumatic pump, said control valve assembly including means defining an inlet communicating with said main passageway and means defining an outlet, a valve plate disposed adjacent said inlet for opening and closing said inlet, first biasing means biasing said valve plate in a direction to close said inlet, and second biasing means in communication with said air gallery and being responsive to at least one of the pressures prevailing in said air gallery and the pressures prevailing in said exhaust manifold to bias said valve plate in a direction to close said inlet, whereby said valve plate is movable to open and close said inlet thereby to vary the level of secondary air pressure in said main passageway in dependence on the pressure difference between said secondary air pressure and the pressures of said first biasing means and said second biasing means.

3. A system according to claim 2, wherein said first biasing means includes a compression spring.

4. A system according to claim 2, wherein said second biasing means includes a diaphragm member which is connected to said valve plate.

5. In an automotive internal combustion engine having an exhaust port located downstream of an exhaust valve and an exhaust manifold communicating with said exhaust port, a system for regulating the amount of secondary air to be fed to said exhaust manifold downstream of said exhaust port for oxidizing unburned exhaust gases from said engine comprising, in combination, a pneumatic pump driven by said engine for supplying secondary air to said exhaust manifold, a main passageway communicating with said pneumatic pump, a check valve disposed in said main passageway to prevent the back-flow of the exhaust gases to said pneumatic pump, an air gallery communicating with said main passageway downstream of said check valve, a secondary air inlet pipe communicating with said air gallery and opening into said exhaust manifold and being exposed to the pressure of the exhaust gases in said exhaust manifold, and a control valve assembly located in said main passageway downstream of said pneumatic pump, said control valve assembly including a valve casing, first and second chambers defined in said valve casing, said first chamber having means defining an inlet communicating with said main passageway downstream of said pneumatic pump and means defining an outlet opening to the atmosphere, a valve plate slidably disposed in said first chamber to open and close said inlet, a first biasing means disposed in said first chamber and biasing said valve plate in a direction to close said inlet, a second biasing means disposed in said second chamber and cooperating with said first biasing means to bias said valve plate, and a branch passageway connecting said second chamber to said air gallery and said exhaust manifold, said second biasing means being responsive to the pressure prevailing in said air gallery to vary the biasing force thereof in accordance with at least one of said pressures in said gallery and said exhaust manifold, whereby the amount of leakage of secondary air from said main passageway to the atmosphere varies in accordance with pressure difference between said secondary air pressure and the pressure of said exhaust gases.

\* \* \* \* \*